Jan. 26, 1926.  L. W. EVERSMAN  1,570,734
GATE FASTENER
Filed Dec. 14, 1923
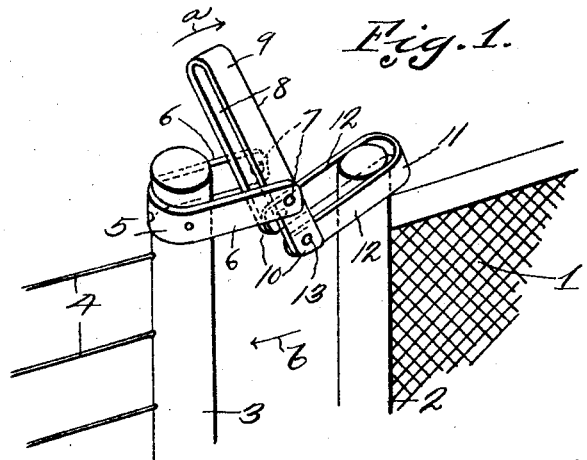
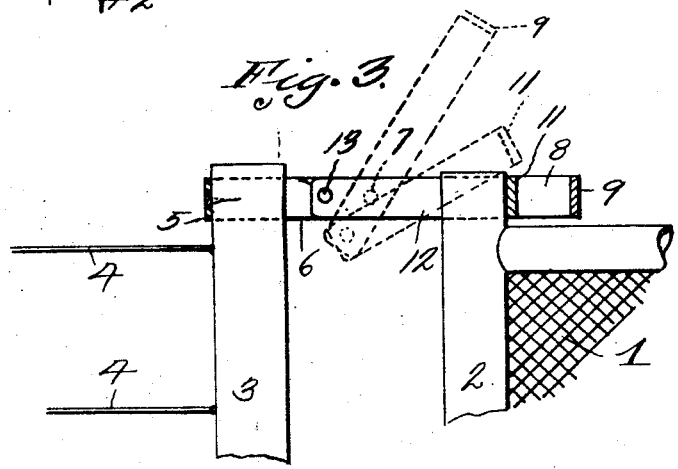
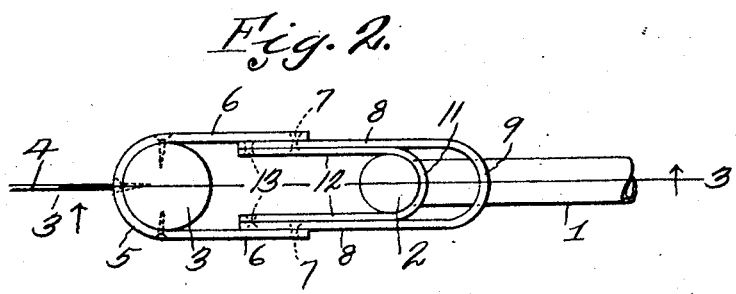
Inventor
L. W. Eversman
By Philip A. H. Sewell
Attorney Patented Jan. 26, 1926.

1,570,734

UNITED STATES PATENT OFFICE.

LEWIS W. EVERSMAN, OF JULESBURG, COLORADO.

GATE FASTENER.

Application filed December 14, 1923. Serial No. 680,676.

*To all whom it may concern:*

Be it known that LEWIS W. EVERSMAN, a citizen of the United States, residing at Julesburg, in the county of Sedgwick and State of Colorado, has invented certain new and useful Improvements in Gate Fasteners, of which the following is a specification, reference being had therein to the accompanying drawings.

The invention relates to gate fasteners and has for its object to provide a device of this character whereby the free end of a gate may be easily and quickly fastened and unfastened from an adjacent gate post.

A further object is to provide a gate fastener for fastening the free end of the gate from adjacent gate posts and comprising a U-shaped member horizontally disposed and attached to the upper end of the gate post and between the arms of which U-shaped member a second U-shaped member has its arms pivotally connected adjacent their ends, and which ends of the second U-shaped member have pivotally connected thereto, the arms of a third U-shaped member adapted to engage over the posts of the free ends of the gate, in a manner whereby, when the second U-shaped member is moved over the gate carried post, said gate will be securely held against movement in either direction. When the fastener is in closed position, the second U-shaped member is held in close engagement with the gate carried post, and the gate positively locked.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:—

Figure 1 is a perspective view of the free end of a conventional form of horizontally movable gate, a gate post, and showing the device applied thereto.

Figure 2 is a top plan view of the device, showing the same applied to the gate.

Figure 3 is a sectional view taken on line 3—3 of Figure 2.

Referring to the drawing, the numeral 1 designates the free end of a conventional form of gate, preferably of a wire gate type, and 2 the vertical posts carried by said free end. Disposed adjacent the free end of the gate is a conventional form of gate post 3, to which fence wires 4 may be attached in any suitable manner. Gate fasteners as at present constructed are not positive in their operation and are often rendered inoperative by the sagging of the gate, or by varying of the distance between the free end of the gate and the gate post 3. To obviate this difficulty a gate fastener is provided, which comprises a U-shaped member 5, which member is secured to the gate post 3 and has its arms 6 in parallel relation and extending towards the free end of the gate 1. Pivotally connected at 7 to the outer ends of arms 6 of the U-shaped member 5 at points spaced from their ends are the arms 8 of a second U-shaped member 9. The U-shaped member 9 when moved in the direction of the arrow *a* causes the ends 10 of the arms thereof to move in the direction of the arrow *b*, thereby imparting a pull on the third U-shaped member 11 which has its arms 12 pivotally connected at 13 to the ends 10 of the arms 8 of the second U-shaped member, therefore it will be seen that a pull is imparted on the third U-shaped member 11, which member, during a gate fastening operation, is placed over the gate carried post 2 as shown in Figure 1, consequently when the second U-shaped member 9 is moved to the positions shown in Figures 2 and 3, the U-shaped member 11 will be forced into close and binding engagement with the gate carried post 2, thereby securely holding the gate against lateral movement, or if a sliding gate, against sliding movement. The action is an eccentric one, and it will be seen when the pivotal points 13 and 7 are in the horizontal position shown in Figure 3, there is no danger of the gate fastener opening until the operator grasps the free end of the second U-shaped member 9 and raises the same, which action will move the U-shaped member 11 out of close and binding engagement with the gate post 2 carried by the free end of the gate. When the gate is in open position the U-shaped members 9 and 11 are disposed in engagement with the upper end of the gate post 3 with the U-shaped member 11 within the U-shaped member 9.

Although the device has been described and shown in connection with a conventional form of wire gate and gate post, it is to be understood that it may be applied to various kinds and types of gates, and the device may be applied either to a swinging or a sliding gate if desired.

From the above it will be seen that a gate fastening device is provided, which device is simple in construction, formed from three pivotally connected U-shaped members and constructed in a manner whereby when the device is in closed position the free end of a gate will be positively held against releasing the free end of the gate until the U-shaped member 9 is raised, at which time an eccentric releasing action takes place for moving the U-shaped member 11 out of operative position.

The invention having been set forth what is claimed as new and useful is:—

The combination with the free end of a gate having an upwardly extending projection, a gate post adjacent said free end of the gate, of a gate fastener, said fastener comprising a horizontally disposed U-shaped member arching one side of and secured to the gate post and extending towards the free end of the gate, a second U-shaped member having its arms pivoted to the inner sides of the arms of the first mentioned U-shaped member at points spaced from the ends of the arms of the second U-shaped member and a third U-shaped member having its arms pivoted to the inner sides of the ends of the arms of the second U-shaped member and adapted to receive the upwardly extending extension carried by the free end of the gate and to be moved into close and binding engagement therewith when the second U-shaped member is moved over the projection and over the third U-shaped member.

In testimony whereof I hereunto affix my signature.

LEWIS W. EVERSMAN.